(12) United States Patent
Mueller et al.

(10) Patent No.: US 7,814,210 B1
(45) Date of Patent: Oct. 12, 2010

(54) NON-DISRUPTIVE SERVER REPLACEMENT FOR SERVER-BASED CLIENTS

(75) Inventors: Garrett Mueller, San Jose, CA (US);
Roger Cox, Los Altos, CA (US);
Gyanendra Pradhan, Campbell, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 1022 days.

(21) Appl. No.: 11/117,933

(22) Filed: Apr. 29, 2005

(51) Int. Cl.
*G06F 15/16* (2006.01)

(52) U.S. Cl. .................. 709/227; 709/203; 709/217; 709/218; 709/219

(58) Field of Classification Search .................. 709/227
See application file for complete search history.

(56) References Cited

U.S. PATENT DOCUMENTS

| | | | |
|---|---|---|---|
| 6,539,494 B1 * | 3/2003 | Abramson et al. | 714/4 |
| 7,076,555 B1 * | 7/2006 | Orman et al. | 709/227 |
| 7,373,415 B1 * | 5/2008 | DeShan et al. | 709/231 |
| 2005/0193245 A1 * | 9/2005 | Hayden et al. | 714/13 |

OTHER PUBLICATIONS

CIFS Explained, 2001, CodeFX, pp. 1 and 8.*

* cited by examiner

*Primary Examiner*—Philip C Lee
*Assistant Examiner*—Angela Nguyen
(74) *Attorney, Agent, or Firm*—Blakely, Sokoloff, Taylor & Zafman LLP (57) ABSTRACT

Non-disruptive server replacement for session-based clients. An embodiment of a method includes establishment of a session between a storage server and a client, with the storage server including a session data structure for the session, and transferring an operation of the storage server to a replacement storage server. Transferring the operation of the storage server includes generating an image the session data structure and placing the image in the replacement storage server, transferring operation of the session data structure in the storage server to the image of the session data structure in the replacement storage server, and transferring a network address of the storage server to the replacement storage server.

34 Claims, 8 Drawing Sheets

NON-DISRUPTIVE SERVER REPLACEMENT FOR SERVER-BASED CLIENTS

FIELD OF THE INVENTION

At least one embodiment of the present invention pertains to data storage, and more particularly to a method and apparatus for non-disruptive server replacement for session-based clients.

BACKGROUND

A storage server is a special-purpose processing system used to store and retrieve data on behalf of one or more client processing systems ("clients"). A file server is an example of a storage server. A file server operates on behalf of one or more clients to store and manage shared files in a set of mass storage devices, such as magnetic or optical storage based disks or tapes. The mass storage devices may be organized into one or more groups of Redundant Array of Inexpensive Disks (RAID). In a storage area network (SAN), a storage server can provide clients with block-level access to stored data, rather than file-level access. Some storage servers are capable of providing clients with both file-level access and block-level access, such as certain filers produced by Network Appliance, Inc. of Sunnyvale, Calif.

In certain circumstances, a storage server may require replacement. The reasons for replacement may include failure or other operational problems, necessary maintenance, or installation of an upgrade. However, the operations of the server may require continuation during the replacement of the server.

In conventional operations in a session-based environment, sessions will terminate in a transfer to another server because the session information isn't propagated to or available for the replacement server. Further, the replacement of one server with another may result in an interruption in service if the change does not occur quickly enough. In such an environment, a communication from a client may be made during a replacement process. If there is a sufficient delay in a response to the communication, this delay may cause the session to be terminated.

SUMMARY OF THE INVENTION

An embodiment of the invention provides for non-disruptive server replacement for session-based clients.

An embodiment of a method includes establishing a session between a storage server and a client, where the storage server includes session data structures for the session. An operation of the storage server is transferred to a replacement storage server. The transfer of the operation of the storage server includes generating an image of the session data structure and placing the image in the replacement storage server, transferring operation of the session data structure in the storage server to the image of the session data structure in the replacement storage server, and transferring the network address of the storage server to the replacement storage server.

Other aspects of the invention will be apparent from the accompanying figures and from the detailed description that follows.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and apparatus for non-disruptive server replacement for session-based clients are described.

In one embodiment of the invention, a storage server that is engaged in a session with a client or a component of such a server is replaced by one or more other servers or components without service disruption. In an embodiment, the operations of a storage server are transferred to one or more other servers during a continuing session with a client.

A storage server or a component of a server may be replaced for various reasons. The server or component may fail or have other operational problems, may require maintenance, or may be upgraded. In certain circumstances, the operations of the storage server may be required to continue during the replacement operation. In a session-based environment, certain delays in communication may be tolerated, but excessive delay may result in termination of the session, and thus in a disruption of service to a client. In order to prevent service disruption, a replacement of a server or server component should be completed and operations be continued by a replacement before the session times out and is then terminated.

As used herein, a "session" is a lasting or persistent connection between two entities, such as a client and a server. A session may include multiple interactions between the entities during the existence of the connection. A "session-based environment" is a communication environment in which entities exchange information through session communications.

In one example, the file transfer protocol of a system may include CIFS (Common Internet File System), a file-sharing protocol developed by Microsoft and that evolved from the earlier SMB (Server Message Block) system. A CIFS software layer will run on top of a TCP (Transfer Control Protocol) software layer. In an environment using CIFS, a session is terminated if a response to a data request is not received within a certain time period. In an embodiment of the invention, a transfer of operations from a server or server component to one or more replacement servers or components in a session-based environment is coordinated to avoid termination of a session between a client and the server.

The replacement of a storage server or a server component in a session-based environment may include the transfer of session data structures from the server to a replacement server and the transfer of the IP (Internet Protocol) address or other network address of the server to the replacement server. The storage server may have multiple network addresses, and the sessions related to each such address may be transferred to different replacement servers. As used herein, "session data structures" are data structures or objects that exist only during a session between a client and a storage server. Session data structures contain the server's internal representation of the session, including information about the client related to the session and context that is shared between session participants. Such data structures may include, for example, structures for user authentication, open files, and context specific views. In an embodiment of the invention, session data structures are transferred in a manner to minimize the amount of time that the server and the replacement server are unable to respond to requests. In an embodiment of the invention, the transfer of the network address of the original server to the replacement server or servers is coordinated with the transfer of session data structures to avoid service disruption.

Conventional failover techniques to replace server operations do not preserve live session data. Some systems protocols may not need to keep session context alive in order to perform work, and such protocols may not be affected by closing TCP ports and re-opening such ports in a failover processes. However, certain session-based protocols have operations that inherently cannot survive these types of outages. An embodiment of the invention supports a replacement process that preserves session data.

A storage server may include a single component or unit, or may include multiple components. The components may have various functions and operations, depending on the particular server configuration. In one example, the storage server may include a network component (which may be referred to as a network blade, or N-blade) and a data component (which may be referred to as a data blade, or D-blade). In this particular example, the network component interfaces with a network connection, and a client may communicate with the storage server through the network component. The network component is coupled with the data component, and the data component interfaces with a data storage that contains stored data. A D-blade and an N-blade may exist together as a unit, such as in a single box or cabinet. However, this arrangement is not necessary and the structure of storage servers may vary. In certain operations, a cluster may include multiple N-blades and multiple D-blades, with any of the D-blades being capable of communicating with any of the N-blades.

In an embodiment of the invention, different servers or components of different servers may communicate with each other. For example, the network component of a first server may have a communication link with the network component of a second server to enable communication between such components. The communication between the components may be used in transfer of operations between servers.

Embodiments of the invention may include various different processes or mechanisms for initiating transfers of server operations and for choosing replacement servers or components. In one embodiment of the invention, a system administrator chooses which server servers will participate in a server replacement. In another embodiment, a process or mechanism may automatically choose which servers or server components should be replaced and which components should act as replacements.

In one embodiment, in order to switch operations from a server to a replacement server, session-based data structures are copied or transferred from the server to the replacement server. For example, the session data structures contained in a network component (or N-blade) of a storage server may be transferred to network components of one or more replacement servers. A transfer of a network address of the original server to the replacement server is coordinated with the transfer of the session data structures associated with the network address. When this transfer of session data structures and network address is completed, images of the session data structures from the network component of the original server are present and active in the network component of the replacement server. The network component of the replacement server then is in communication with the data component of the original server and can access the data storage of the original server in this manner. If needed, this may then be followed by the transfer of the operations of the data component of the original server to the data component of the replacement server or to another data component.

In a first embodiment of the invention, each session data structure present in an original server associated with a network address is copied to a replacement server, and this is followed by the transfer of the network address from the original server to the replacement server. In this embodiment, an image is created and maintained for each session data structure of a network blade of the original server. During the process of creating and maintaining the images of the session data structures in the replacement server, the original server continues to operate and the data structure images in the replacement server are not yet operational. When all images of the session-based data structures have been created in the replacement server and all such data structure images are up-to-date, then the network address of the original server is transferred to the replacement server and all of the images of data structures of the replacement server become operational data structures. Under an embodiment of the invention, network addresses are moved or swapped between a server and a replacement server, which will also include the transfer of TCP context data between server components together with the session information, which may be done using known processes.

In a second embodiment of the invention, operational copies of session data structures of a server associated with a network address of the server are created in a replacement server and data requests are forwarded to the transferred data structures. When all copies of all session data structures are generated, the network address is transferred from the original server to the replacement server. In this embodiment, an image of each session data structure in the network component of a server is generated in the network component of a replacement server. A proxy relationship is created between the server and the replacement server in which the replacement server acts in place of the server. As each data structure is generated in the replacement server, the data structures become operational and data traffic that was intended for a session data structure in the original server is forwarded to the replacement server to be handled by the relevant image in the replacement server. When all session data structures of the original server associated with a particular network address are transferred to the replacement server, then the network address of the original server is transferred to the replacement server such that the replacement server may replace these operations of the original server.

In a third embodiment of the invention, a network address of the original server is transferred to the replacement server, which is followed by generation of images of session data structures for the replacement server as data requests are received. In this embodiment, when a replacement server is identified, the network address of the original server is transferred to the replacement server, and thus any data requests intended for the original server will be received by the replacement server. When a data request is received that relates to a session data structure that still remains in the original server, an image of the appropriate data structure is generated in the replacement server and is made operational. The process may be combined with the transfer of other session data structures, such as session data structures that are not immediately active or that are of high importance, in order to minimize the time required to complete the migration of all session data structures from the original server to the replacement server. Any active sessions that are not currently making data requests may be transferred in coordination with the other sessions. When images of all such session data structures are present and active in the replacement server or servers, then all operations of the original server for the network address have been transferred.

Figure 1:
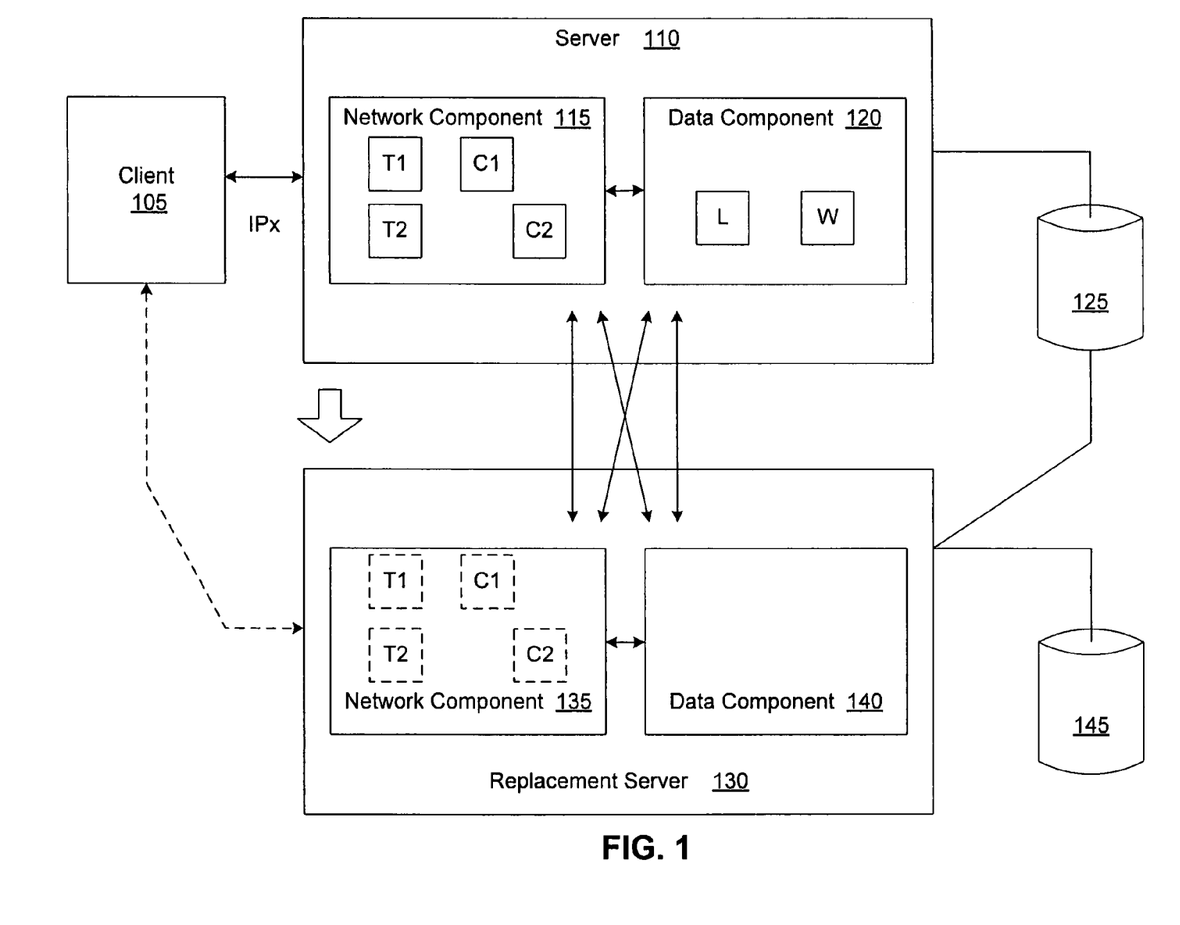
FIG. 1 illustrates a first embodiment of server replacement providing for generation and maintenance of session data structure images before transfer of an address to replacement server.

FIG. 1 illustrates a first embodiment of server replacement providing for generation and maintenance of session data structure images before transfer of an address to replacement server. In this illustration, a client 105 engages in a session with a server 110. The client 105 may communicate with the server 110 over a network, which is not illustrated in this figure. The server may be configured in many different ways and embodiments of the invention are not limited to any particular configuration. The server may include a single component or unit, or may include multiple components. In one particular example, the server may include two components. In this example, the server includes a network component (N-blade) 115 and a data component (D-blade) 120. While the servers illustrated in the figures are shown as having a network component and data component, the components are not necessarily combined in server units, but rather can be separate components that are associated with each other.

In a session-based environment, the network component 115 and data component 120 may include session data structures for client sessions. In an example of a session utilizing CIFS, the network component may include CIFS session data structures (shown as structures C1 and C2) and TCP data structures (T1 and T2). The data component 120 also includes session data structures, which in this example are illustrated as, for example, a lock table data structure (shown as structure L) and a watch data structure (structure W). The particular data structures shown in FIG. 1 and the other figures are only possible examples, and other types of data structures may be present in addition to or instead of these examples. The server 110 is coupled with a data storage 125. The client may access the data storage 125 via the server 110. In addition, the client could access the data storage 125 via one or more other servers, including server 130.

The server 110 may require replacement for any of various different reasons, including operational problems, scheduled maintenance of the server, or upgrading of the server. The replacement may be temporary or permanent. In order to continue operations for the client 105 in a session, the operations of the server 110 may be transferred to one or more replacement servers, such as replacement server 130. The replacement server 130 may have a network component 135 and a data component 140. The replacement server 130 is coupled with a data storage 145, but also is coupled with the data storage 125 accessed by the original server 110. The network component 135 of the replacement server 130 is capable of communicating with the data component 140 of the replacement, but is also capable of communicating with the data component 120 of the original server 110. In addition to accessing the data storage 145, the replacement server 130 may access the data storage 125 of the original server 110. In this example, the network and data components of the server may also communicate with other network and data components.

In order to transfer the operation of the server 110 to the replacement server 130, images of the session data structures contained in the network component 115 of the server 110 are generated and placed in the network component 135 of the replacement server 130, shown as the images of data structures T1, T2, C1, and C2. In this embodiment, the images are not initially active and the original session data structures continue in operation. The session data structures in the network component 115 of the server may be modified, and the images in the network component 135 of the replacement server 130 are maintained to keep the images current with any modifications to the session data structures in the network component 115 of the server 110. Maintenance of the images may include removal of the images of data structures associated with a particular session if the session is terminated for any reason. When the network component 135 of the replacement server 130 contains current images of all of session data structures of the network component 115 of the server 110, the network address (IPx) of the server 110 is transferred to the replacement server 130 and images in the network component 135 become operational. Thus, if a data request is made while the transfer is occurring, the delay to the client is only the time to switch the network address and initiate operation of the session data structures of the network component 135. The network component 135 of the replacement server 130 then may communicate with the data component 120 of the server 110 to access the data storage 125. This may be followed by transfer of the session data structures of the data component 120 of the server 110 to the data component 140 of the replacement server 130 (or to another data component) and, upon transfer of all session associated with each network address of the server 110, taking the server 110 off-line. For simplicity, the example shown refers to a single network address, but a server may have multiple network addresses and there may be multiple sessions associated with each of the network addresses. The network addresses and related sessions may be transferred to multiple different replacement servers.

Figure 2:
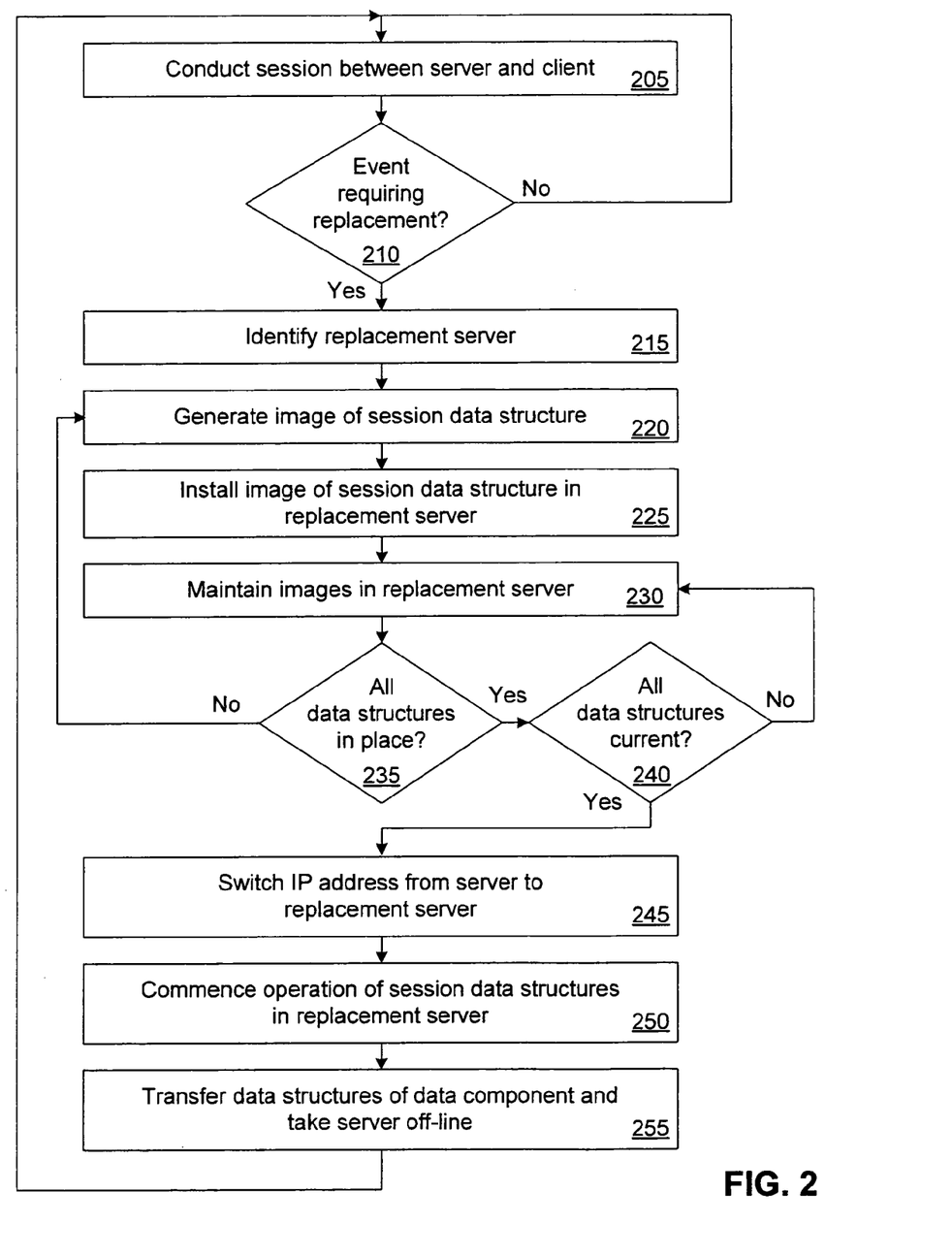
FIG. 2 is a flow chart illustrating the first embodiment of server replacement for a session-based client.

FIG. 2 is a flow chart illustrating the first embodiment of server replacement for a session-based client. In this embodiment, a session is conducted between a storage server and a client 205. The session may include the use of CIFS protocol. During the session, an event may occur requiring replacement of the server 210 or a component of the server, such as operational problems, maintenance, or upgrade of the server. If so, a replacement server is identified 215. The identification of a replacement may be performed by a system administrator, an automatic process, or other type of operation. An image is generated of a session data structure 220. In one example, the session data structure is located in a network component (N-blade) of the server. The image of the session data structure is installed in the replacement server 225, such as in the network component of the replacement server. Any images that have already been generated are maintained 230 in order to keep the images current. Maintenance of session data structures may include modification or removal of structures as needed. If all data structures are not in place in the replacement server 235, then the process of generating the data structures continues. If the session data structures of the replacement server are not current 240, then the process of maintaining the images continues. If all session data structures have been placed in the replacement server and are current, then the network address of the server may be transferred to the replacement server 245, and the operation of the session data structures in the replacement server may commence 250. In certain examples the process may continue with the transfer of session data structures from a data component (D-blade) of the server to a data component of the replacement server or another replacement server, and, upon transfer of all sessions of the server to one or more replacement servers, the server may be taken off-line 255.

Figure 3:
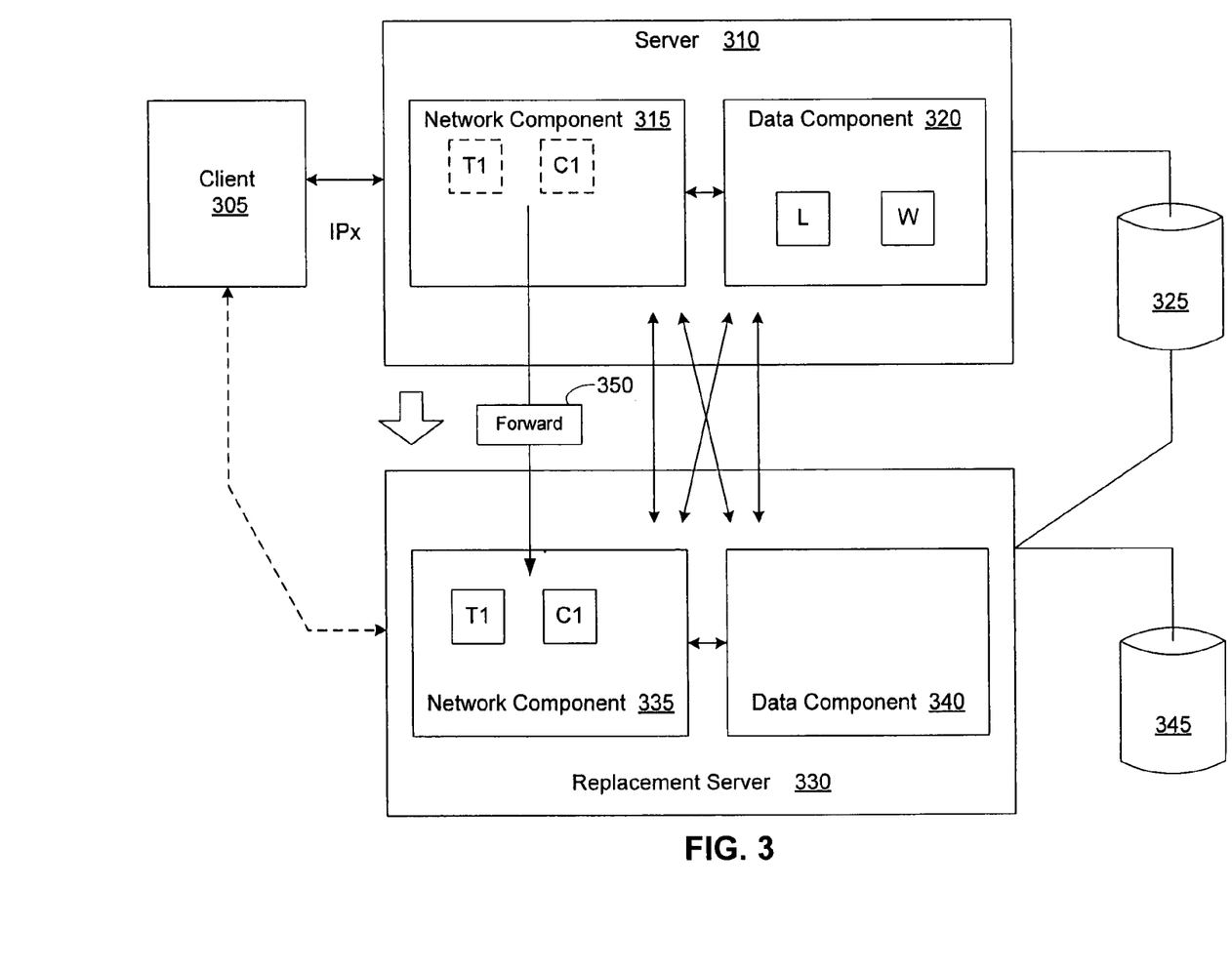
FIG. 3 illustrates a second embodiment of server replacement providing for generation of operational data structures in a replacement server and forwarding data requests to the replacement server.

FIG. 3 illustrates a second embodiment of server replacement providing for generation of operational data structures in a replacement server and forwarding data requests to the replacement server. In this illustration, a client 305 again engages in a session with a server 310. The server may include a network component (N-blade) 315 and a data component (D-blade) 320. In a session-based environment, the network component 315 and data component 320 may include session data structures for client sessions. In this example, the network component may include a CIFS data structure (shown as structure C1) and a TCP data structure (T1). The data component 320 also includes session data structures, which in this example are illustrated as a lock table data structure (structure L) and a watch data structure (structure W). The server 310 is coupled with a data storage 325.

The server 310 or a component of the server may again require replacement, with the operations of the server 310 being transferred to a replacement server 330. In this illustration, the replacement server includes a network component 335 and a data component 340. The replacement server 330 is coupled with a data storage 345 and with the data storage 325 accessed by the original server 310. The network component 335 of the replacement server 330 is capable of communicating with the data component 340 of the replacement sever 330 and with the data component 320 of the original server 310. In this example, the network and data components of the server may also communicate with other network and data components.

In order to transfer the operation of the server 310 to the replacement server 330, images of the session data structures contained in the network component 315 of the server 310 are generated and placed in the network component 335 of the replacement server 330, shown as the images of data structures T1 and C1. In this embodiment, the generated images are operational and the original data structures cease operation. A proxy relationship exists between the server and the replacement server, with the replacement server acting in place of the server. Upon generating an image of a session data structure, placing the session data structure in the network component 335 of the replacement server 330, and activating the session data structure, any requests relating to the session data structure are forwarded 350 to the replacement server 330. When the network component 335 of the replacement server 330 contains active images of all of session data structures of the network component 315 of the server 310, the network address (IPx) of the server 310 is moved to the replacement server 330. Thus, if a data request is made, the delay to the client is only the time to switch a single session data structure and forward a request (if a request is made while a data structure is being moved) or the time to transfer the network address (if a request is made while the network address is being transferred). This may be followed by transfer of the session data structures of the data component 320 of the server 310 to the data component 340 of the replacement server 330 or another replacement server and, upon transfer of all sessions of the server 310, taking the server 310 off-line.

Figure 4:
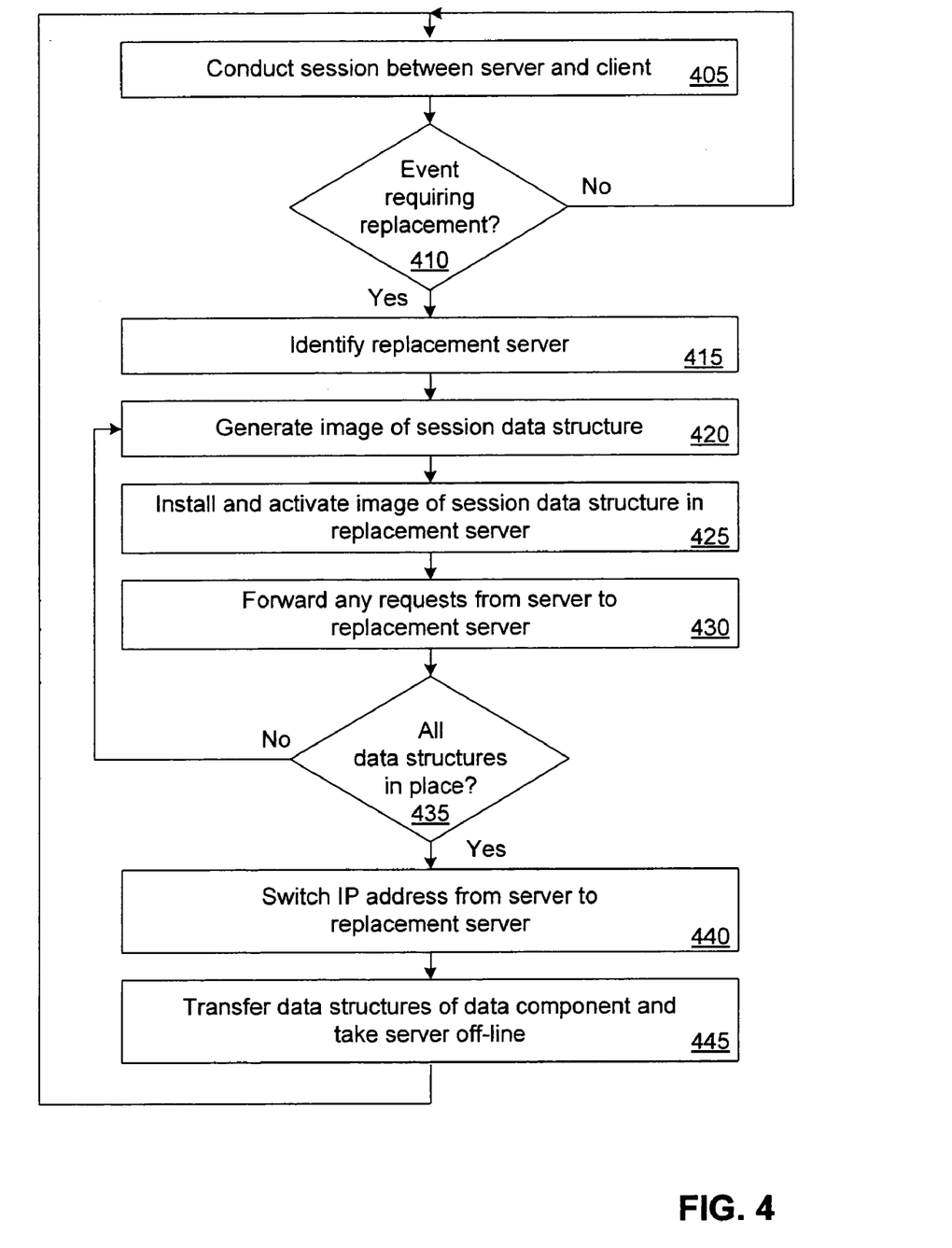
FIG. 4 is a flow chart illustrating the second embodiment of server replacement for a session-based client.

FIG. 4 is a flow chart illustrating the second embodiment of server replacement for a session-based client. In this embodiment, a session is conducted between a storage server and a client 405, again may including the use of CIFS protocol. During the session, an event may occur requiring replacement of the server 410 or a component of the server. If so, a replacement server is identified 415. An image is generated of a session data structure 420, such as a session data structure in a network component (N-blade) of the server. The image of the session data structure is installed and activated in the replacement server 425, such as in the network component of the replacement server. Any request relating to a transferred session data structure is forwarded from the server to the replacement server 430. If all session data structures are not in place in the replacement server 435, then the process of generating the data structures continues. If all session data structures have been placed in the replacement server, then the network address may be switched from the server to the replacement server 440 since all session data structure operations are in the replacement server. The process may continue with the transfer of session data structures from a data component (D-blade) of the server to a data component of the replacement server, and, upon transfer of all sessions of the server to one or more replacement servers the server may be taken off-line 445.

Figure 5:
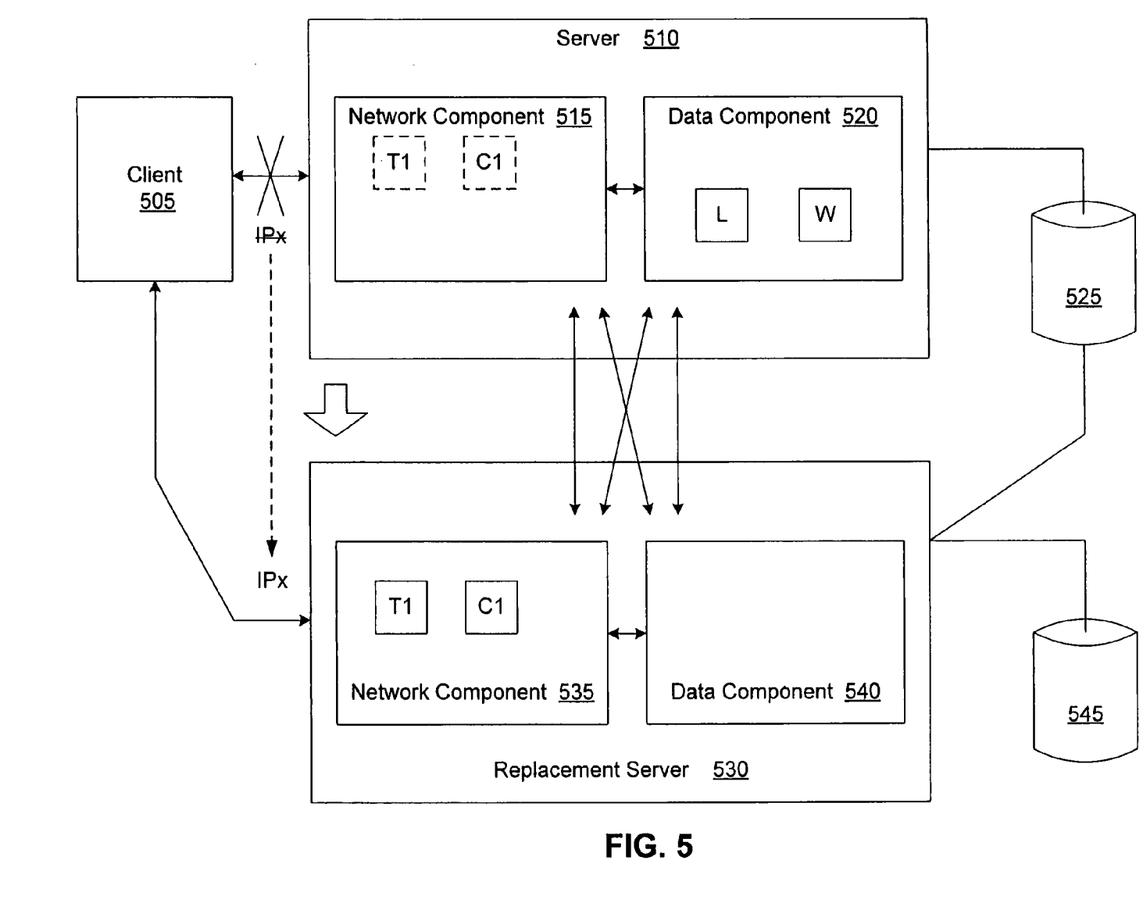
FIG. 5 illustrates a third embodiment of server replacement for a session-based client providing for transference of network address and transference of data structures as requests are received.

FIG. 5 illustrates a third embodiment of server replacement for a session-based client providing for transference of network address and transference of data structures as requests are received. In this illustration, a client 505 again engages in a session with a server 510. The server may include a network component (N-blade) 515 and a data component (D-blade) 520. In a session-based environment, the network component 515 and data component 520 may include session data structures for client sessions. In this example, the network component may include a CIFS data structure (shown as structure C1) and a TCP data structure (T1). The data component 520 also includes session data structures, which in this example are illustrated as a lock table data structure (structure L) and a watch data structure (structure W). The server 510 is coupled with a data storage 525.

The server 510 or a component of the server may again require replacement, with the operations of the server 510 being transferred to a replacement server 530. The replacement server 530 includes a network component 535 and a data component 540. The replacement server 530 is coupled with a data storage 545 and with the data storage 525 accessed by the original server 510. The network component 535 of the replacement server 530 is capable of communicating with the data component 540 of the replacement server 530 and with the data component 520 of the original server 510. In this example, the network and data components of the server may also communicate with other network and data components.

In order to transfer certain operations of the server 510 to the replacement server 530, a network address (shown as IPx) is transferred from the server 510 to the replacement server 530. After such transfer, any data requests associated with the network address will be received at the replacement server. Other network addresses may be transferred to the replacement server 530 or to other replacement servers. In this embodiment, when a data request is received that relates to an session data structure that is not yet contained in the replacement server, an image of the session data structure contained in the network component 515 of the server 510 is generated and the image is placed in the network component 535 of the replacement server 530 and activated. In the illustration, the data structures T1 and C1 are transferred in response to requests received by the replacement server 530. In this embodiment, the images are operational and the original data structures cease operation. Thus, if a data request is made by a client, the delay to the client is the time to receive a request, determine that the data structure is not present, generate an image of the needed data structure, and then insert the data structure in the replacement server 540. When the network component 535 of the replacement server 530 contains active images of all of session data structures of the network component 515 of the server 510, the transfer is completed. This may be followed by transfer of the session data structures of the data component 520 of the server 510 to the data component 540 of the replacement server 530 and, upon transfer of all sessions of the server 510, taking the server 510 off-line.

Figure 6:
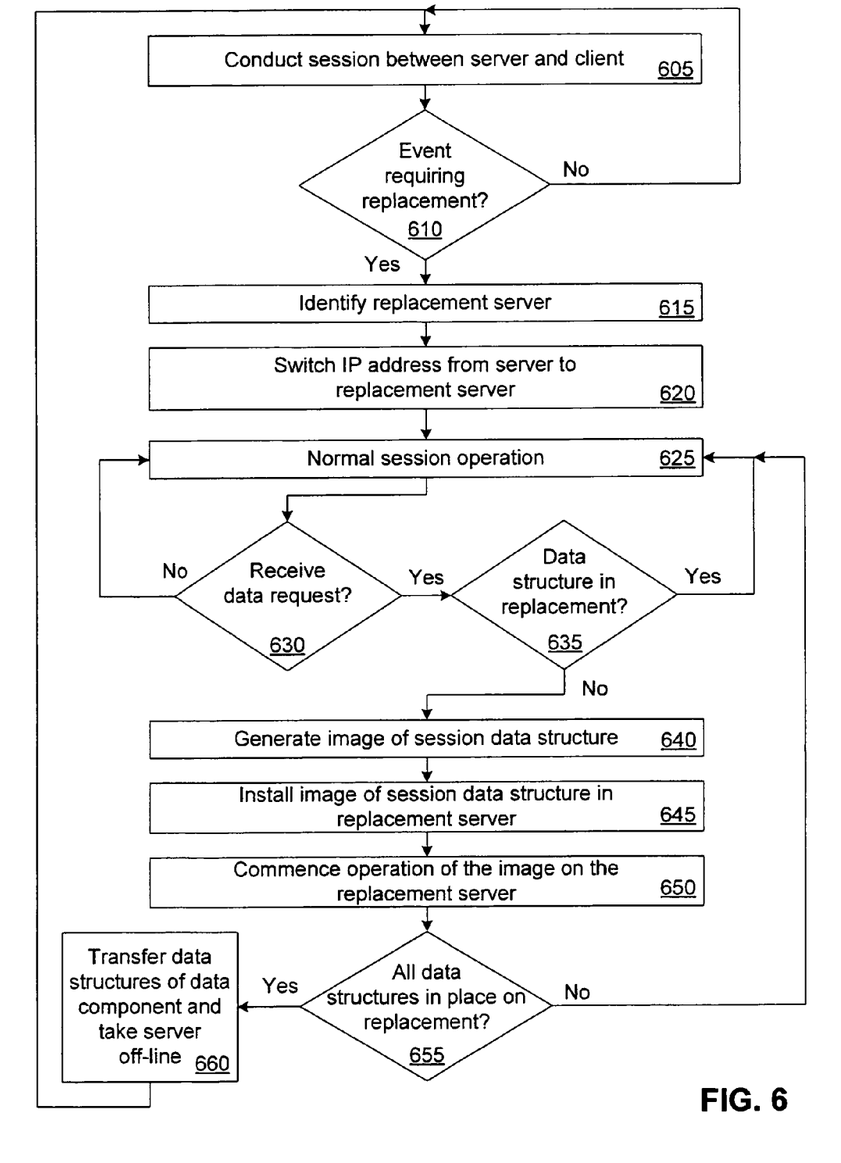
FIG. 6 is a flow chart illustrating the third embodiment of server replacement for a session-based client.

FIG. 6 is a flow chart illustrating the third embodiment of server replacement for a session-based client. In this embodiment, a session is conducted between a storage server and a client 605. The session may include the use of CIFS protocol. During the session, an event may occur requiring replacement of the server 610 or a component of the server. If so, a replacement server is identified 615. A network address of the server is transferred from the server to the replacement server 620. The normal session operations are then followed 625. If a data request is received 630, there is a determination whether the relevant session data structure is present in the replacement server 635. If so, normal operations continue 625. If not, then an image of the session data structure is generated 640, such as in a network component (N-blade) of the server. The image of the session data structure is installed in the replacement server 645 and operation of the session data structure is commenced 650. If all data structures are not in place in the replacement server 650, then the session operations continue 625. If all session data structures have been placed in the replacement server, then the transfer to the replacement server is complete. The process may continue with the transfer of session data structures from a data component (D-blade) of the server to a data component of the replacement server, and, upon transfer of all sessions of the server to one or more replacement servers, the server may be taken off-line 660.

Figure 7:
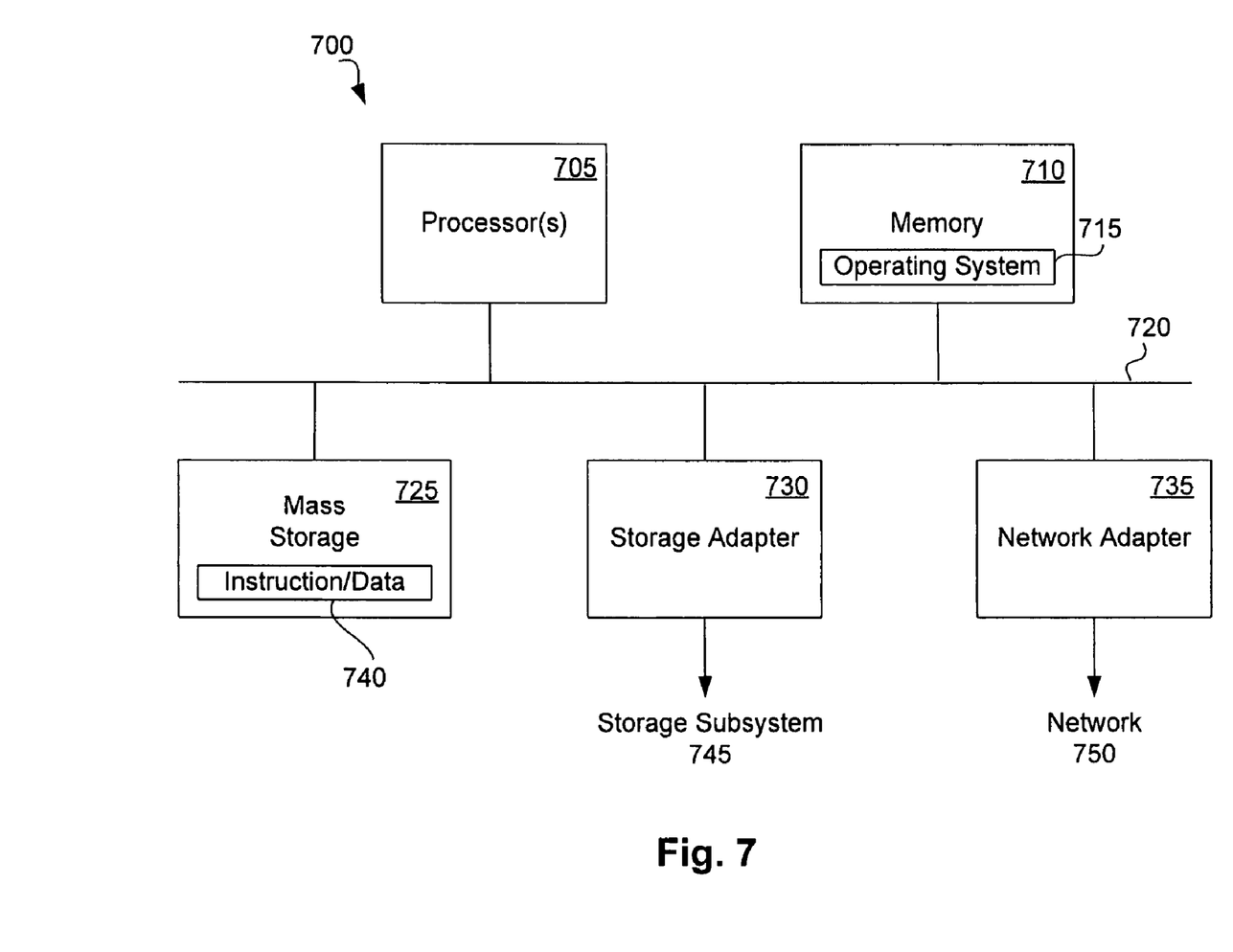
FIG. 7 is a block diagram illustrating an architecture of a file server that may implement an embodiment of the invention.

FIG. 7 is a block diagram illustrating an architecture of a file server that may implement an embodiment of the invention. Certain standard and well-known components that are not germane to the present invention may not be shown. In an embodiment of the invention a file server may be organized as a network component, or N-blade, and a data component, or D-blade. A file server 700 includes one or more processors 705 and memory 710 coupled to a bus system 720. The bus system 720 shown in FIG. 7 is an abstraction that represents any one or more separate physical buses, point-to-point connections, or both connected by appropriate bridges, adapters, or controllers. The bus system 720, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements)

The processors 705 are the central processing units (CPUs) of the file server 700 and, thus, control the overall operation of the file server 700. In certain embodiments, the processors 705 accomplish this by executing software stored in memory 710. A processor 705 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 710 is or includes the main memory of the file server 700. Memory 710 represents any form of random access memory (RAM), read-only memory (ROM), flash memory, or the like, or a combination of such devices. Memory 710 stores, among other things, the operating system 715 of the file server 700.

Also connected to the processors 705 through the bus system 720 may be one or more internal mass storage devices 725, a storage adapter 730 and a network adapter 735. An embodiment of a filter may not include any internal mass storage. Internal mass storage devices 725 may be or include any conventional medium for storing large volumes of instructions and data 740 in a non-volatile manner, such as one or more magnetic or optical based disks. The storage adapter 730 allows the file server 700 to access a storage subsystem 745 and may be, for example, a Fibre Channel adapter or a SCSI adapter. The storage adapter 730 may interface with a D-blade portion of the file server. The network adapter 735 provides the file server 700 with the ability to communicate with remote devices, such as clients, over a network 750 and may be, for example, an Ethernet adapter. The network adapter 735 may interface with an N-blade portion of the file server.

Figure 8:
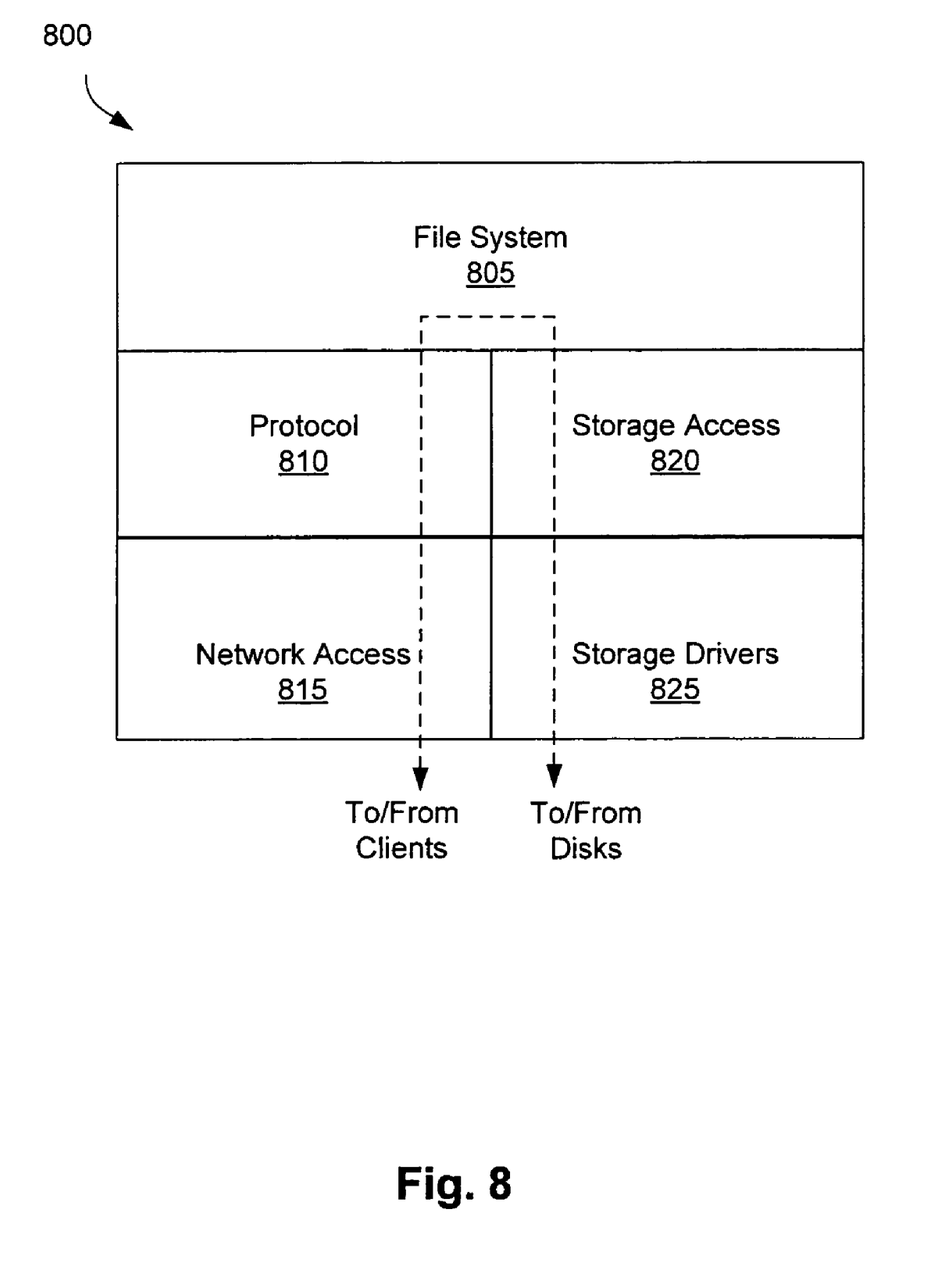
FIG. 8 illustrates an example of an operating system of a file server according to an embodiment of the invention.

FIG. 8 illustrates an example of an operating system of a file server according to an embodiment of the invention. As shown, an operating system 800 includes several modules, or "layers". These layers include a file system 805. The file system 805 is application-layer software that keeps track of the directory structure (hierarchy) of the data stored in a storage subsystem and manages read/write operations on the data (i.e., executes read/write operations on the disks in response to client requests). Logically "under" the file system 805, the operating system 700 also includes a protocol layer 810 and an associated network access layer 815, to allow a file server to communicate a network, such as clients. The protocol 810 layer implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 815 includes one or more drivers, which implement one or more lower-level protocols to communicate over the network, such as Ethernet.

Also logically under the file system 805, the operating system 800 includes a storage access layer 820 and an associated storage driver layer 825, to allow a file server to communicate with a storage subsystem. The storage access layer 820 implements a higher-level disk storage protocol, such as RAID, while the storage driver layer 825 implements a lower-level storage device access protocol, such as Fibre Channel Protocol (FCP) or SCSI. To facilitate description, it is henceforth assumed herein that the storage access layer 820 implements a RAID protocol, such as RAID-4 or RAID-DP™ (RAID double parity for data protection provided by Network Appliance, Inc.), and therefore may alternatively be referred to as RAID layer 820. Also shown in FIG. 8 is path 830 of data flow through the operating system 800 associated with a read or write operation.

Thus, a method and apparatus for non-disruptive server replacement for session-based clients have been described. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method comprising:

establishing, by a first storage server, a first session between the first storage server and a client, the first storage server comprising a data component coupled to a data storage, a network component, a session data structure in the network component for the first session, and a session data structure in the data component for the first session; and transferring an operation of the first storage server to a second storage server during the first session with the client, wherein the second storage server is a replacement storage server for the first storage server and the transfer of the operation of the first storage server includes:

generating an image of the session data structure in the network component of the first storage server and placing the image in a network component of the second storage server, transferring a network address of the first storage server to the second storage server, establishing communication between the network component of the second storage server and the data component of the first storage server to enable the network component of the second storage server access to data stored on the data storage coupled to the first storage server, accessing, by the second storage server, the data storage coupled to the first storage server through the network component of the second storage server to service a data request from the client to access the data stored on the data storage, and generating an image of the session data structure for the data component of the first storage server and placing the image in a data component of the second storage server in response to the network component of the second storage server accessing the data storage coupled to the first storage server.

2. The method of claim 1, wherein the image of the session data structure placed in the network component of the second storage server is made operational after images of all session data structures in the network component of the first storage server have been generated and placed in the network component of the second storage server.

3. The method of claim 1, further comprising updating the image of the session data structure in the network component of the second storage server if the respective session data structure in the network component of the first storage server is changed.

4. The method of claim 1, wherein the network address of the first storage server is transferred to the second storage server after the images of all session data structures of the network component of the first storage server have been generated and placed in the network component of the second storage server.

5. The method of claim 1, wherein the image of the session data structure in the data component of the second storage server is made operational after the image of the session data structure is generated and placed in the data component of the second storage server.

6. The method of claim 1, further comprising forwarding a data request sent by the client to the first storage server to the second storage server if the data request relates to the session data structure.

7. The method of claim 1, wherein the network address of the first storage server is transferred to the second storage server before placing images of any session data structures in the network component of the second storage server.

8. The method of claim 7, wherein the image of the session data structure in the network component of the first storage server is generated and placed in the network component of the second storage server when a data request relating to the session data structure in the network component of the first storage server is received by the second storage server.

9. The method of claim 8, wherein the image of the session data structure in the network component of the first storage server is made operational after generating the image and placing the image in the network component of the second storage server.

10. A storage system comprising:

a data storage;

a first storage server coupled with the data storage, the first storage server including a network blade and a data blade, the network blade to hold a session data structure for a first session between the first storage server and a client, the data blade to hold a session data structure for the first session between the first storage server and the client; and a second storage server to replace the operation of the first storage server during the first session with the client for accessing the data storage, wherein the second storage server is a replacement for the first storage server, the second storage server including a network blade and a data blade, the network blade of the second storage server to hold an image of the session data structure in the network blade of the first storage server, the storage system to coordinate transfer of a network address from the first storage server to the second storage server with generation of the image of the session data structure in the network blade of the first storage server during the first session between the first storage server with the client, the network blade of the second storage server to establish communication with the data blade of the first storage server using the image of the session data structure in the network blade of the second storage server and to access to the data storage coupled to the first storage server to service a request from the client to access the data storage, and the data blade of the second storage server to hold an image of the session data structure in the data blade of the first storage server when the network blade of the second storage server accesses the data storage coupled to the first storage server.

11. The storage system of claim 10, wherein the operation of the storage system includes a CIFS (Common Internet File System) protocol for file sharing.

12. The storage system of claim 10, wherein the image of the session data structure in the network blade of the second storage server is not active until images of all session data structures of the network blade of the first storage server are placed in the in the network blade of the second storage server.

13. The storage system of claim 10, wherein the network address of the first storage server is transferred to the second storage server when images of all session data structures of the network blade of the first storage server are placed in the in the network blade of the second storage server.

14. The storage system of claim 10, wherein the image of the session data structure in the data blade of the second storage server is made active when placed in the data blade of the second storage server.

15. The storage system of claim 10, wherein the storage system is to forward a data request sent from a client to the first storage server to the second storage server if the data request relates to the image of the session data structure placed in the network blade of the second storage server.

16. The storage system of claim 10, wherein the network address of the first storage server is transferred to the second storage server before any images of session data structures are placed in the second storage server.

17. The storage system of claim 16, wherein the image of the session data structure in the network blade of the first storage server is to be generated and placed in the network blade of the second storage server if a data request from a client relating to the session data structure is received by the second storage server.

18. The storage system of claim 10, wherein the first storage server and second storage server include a protocol software layer, the protocol software layer including CIFS protocol for file sharing.

19. The storage system of claim 10, wherein the network blade of the second storage server can communicate with the data blade of the second storage server.

20. A first storage server comprising:
a network component, the network component including an image of a session data structure in a network component of a second storage server for a first session, wherein the first session is established between the second storage server with a client, and the image of the session data structure has been transferred from the second storage server during the first session with the client, wherein the first storage server is a replacement storage server for the second storage server, and the network component of the first storage server is to access to a data storage coupled to the second storage server to service a request from the client to access the data storage;
a network adapter coupled with the network component of the first storage server to communicate with the client in the first session using a network address, wherein the network address has been transferred from the second storage server during the first session with the client;
a data component coupled with the network component of the first storage server, the network component to establish communication with the data component and with a data component of the second storage server to enable the network component of the first storage server access to data stored on data storage coupled to the second storage server, the data component of the first storage server including an image of a session data structure in a data component the second storage server in response to the network component of the first storage server accessing data stored on the data storage coupled to the second storage server; and
a storage adapter coupled with the data component of the first storage server to access a set of mass storage devices.

21. The first storage server of claim 20, wherein the image of the session data structure in the network component of the first storage server is not operational unless images of all session data structures in the network component of the second storage server are placed in the network component of the first storage server.

22. The first storage server of claim 20, wherein the network address of the first storage server is not transferred from the second storage server unless images of all session data structures in the network component of the second storage server are placed in the network component of the first storage server.

23. The first storage server of claim 20, wherein the image of the session data structure in the network component of the first storage server is made operational when the image is placed in the network component of the first storage server.

24. The first storage server of claim 20, wherein the first storage server is to receive a forwarded data request from the second storage server if the data request relates to the session data structure.

25. The first storage server of claim 20, wherein the network address of the second storage server is transferred to the first storage server before any images of session data structures are placed in the network component of the first storage server.

26. A non-transitory machine-readable medium having stored thereon data representing sequences of instructions that, when executed by a processor, cause the processor to perform operations comprising:
establishing a first session between a first storage server and a client, the first storage server comprising a data component coupled to a data storage, a network component, and a session data structure in the network component for the first session, a session data structure in the data component for the first session; and
transferring an operation of the first storage server to a second storage server during the first session with the client, wherein the second storage server is a replacement storage server for the first storage server and the transfer of the operation of the first storage server includes:
generating an image of the session data structure in the network component of the first storage server and placing the image in the second storage server,
transferring a network address of the first storage server to the second storage server,
establishing communication between the network component of the second storage server and the data component of the first storage server to enable the network component of the second storage server access to data stored on the data storage coupled to the first storage server, and
accessing, by the second storage server, the data storage coupled to the first storage server through the network component of the second storage server to service a data request from the client to access the data stored on the data storage, and
generating an image of the session data structure for the data component of the first storage server and placing the image in a data component of the second storage server in response to the network component of the second storage server accessing the data storage coupled to the first storage server.

27. The medium of claim 26, wherein the image of the session data structure placed in the network component of the second storage server is made operational after images of all session data structures in the network component of the first storage server have been generated and placed in the network component of the second storage server.

28. The medium of claim 26, wherein the sequences of instructions further include instructions that, when executed by a processor, cause the processor to perform operations comprising updating the image of the session data structure in the network component of the second storage server if the respective session data structure in the network component of the first storage server is changed.

29. The medium of claim 26, wherein the network address of the first storage server is transferred to the second storage server after images of all session data structures of the network component of the first storage server have been generated and placed in the network component of the second storage server.

30. The medium of claim 26, wherein the image of the session data structure in the data component of the second storage server is made operational after the session data structure is generated and placed in the data component of the second storage server.

31. The medium of claim 26, wherein the sequences of instructions further include instructions that, when executed by a processor, cause the processor to perform operations comprising forwarding a data request sent by the client to the first storage server to the second storage server if the data request relates to the session data structure.

32. The medium of claim 26, wherein the network address of the first storage server is transferred to the second storage server before placing images of any session data structures in the network component of the second storage server.

33. The medium of claim 32, wherein the image of the session data structure in the network component of the first storage server is generated and placed in the network component of the second storage server when a data request relating to the session data structure in the network component of the first storage server is received by the second storage server.

34. The medium of claim 33, wherein the image of the session data structure in the network component of the first storage server is made operational after generating the image and placing the image in the network component of the second storage server.

* * * * *